United States Patent Office 3,655,780
Patented Apr. 11, 1972

3,655,780
ISOMERIZATION PROCESS
Gustave K. Kohn and Lawrence E. Stevick, Berkeley, Calif., assignors to Chevron Research Company, San Francisco, Calif.
No Drawing. Continuation-in-part of application Ser. No. 547,145, May 3, 1966. This application Sept. 3, 1968, Ser. No. 757,129
Int. Cl. C07c 39/06
U.S. Cl. 260—624 E
10 Claims

ABSTRACT OF THE DISCLOSURE

Process for isomerizing o- and p-alkylphenols in which the alkyl contains at least 5 carbon atoms to their corresponding m-alkylphenols involving heating the o- and p-species in the presence of an acid-activated alumina-silicate clay having (1) a general crystal lattice comprising a sheet of alumina-octahedra between 2 sheets of silica-tetrahedra, (2) a (001) lattice spacing of 10 to 20 A., (3) less than 1.4 weight percent bound iron, (4) a cationic base exchange capacity of 80 to 120 meq. and (5) base-exchange positions occupied predominantly by Group II metal ions.

CROSS REFERENCE TO RELATED APPLICATIONS

This application is a continuation-in-part of copending application Ser. No. 547,145, filed May 3, 1966.

FIELD OF THE INVENTION

This invention concerns an improvement in the process for isomerizing o- and p-alkylphenols to m-alkylphenols by heating the o- and p-alkylphenols with phenol in the presence of acid and clay. More particularly, it concerns a method for isomerizing o- and p-alkylphenols wherein the alkyl groups contain at least 5 carbon atoms to their corresponding m-alkylphenols in the presence of a specific alumina-silicate clay.

BACKGROUND OF THE INVENTION

In broad terms the art, as exemplified by U.S. Pat. No. 3,014,079, teaches that o- and p-alkylphenols are isomerized to m-alkylphenols by heating the o- and p-species at above about 125° C. in the presence of a strong acid and any natural or synthetic alumina-silicate clay. However, the application of this isomerization technique to o- and p-alkylphenols wherein the alkyl groups contains at least 5 carbon atoms has several disadvantages. Firstly, long reaction periods—in some cases up to 25 to 30 hours—are necessary in prior art processes to reach equilbrium conversion. Some art clays are ineffective. Also, the prior art processes may give side reactions rather than isomerization. For instance, it is taught that o- and p-nonylphenols crack into lower alkylphenols rather than isomerize to m-nonylphenols. And, if the art isomerization catalysts are first used to alkylate phenols with α-olefins intense reaction conditions may be necessary.

INVENTION DESCRIPTION

It has now been found that o- and p-alkylphenols having alkyl groups of at least 5 carbon atoms may be isomerized to their corresponding m-alkylphenols quickly to approximately equilibrium conversions without appreciable side reaction. These unexpected improvements in isomerizing o- and p-$C_5$+alkylphenols are realized by using an alumina-silicate clay having a three-layer crystal lattice comprising a sheet of alumina octahedra between two sheets of silica-tetrahedra, the spacing across (001) being between about 5–30 A., preferably 10–20 A., the clay containing less than about 1.4 weight percent bound iron calculated as $Fe_2O_3$ on a dry weight basis, and having a cationic base-exchange capacity between about 60–120 milliequivalents per 100 g. clay in which the base-exchange positions are occupied predominantly by Group II metal ions, preferably alkaline earth metal ions.

The low bound iron content, base-exchange capacity and specificity in the ions occupying the base-exchange positions are very important to the improved results obtained with this process. Group II metal cations such as calcium, magnesium, barium, strontium and cadmium ions, preferably calcium or magnesium ions, occupy a predominant proportion of the base-exchange positions. Other ions such as alkali metal ions or transition metal ions may occupy a small proportion of the positions. The presence of about more than 1.4 weight percent alkali metal on a dry basis may cause poor isomerization. Natural clays which would be useful in this invention but for the presence of substantial amounts of alkali metal cations in base-exchange positions may be treated with a Group II metal cation source, such as ion exchange resin or alkaline earth metal salt slurry, to replace the alkali metal ions.

Examples of naturally occurring alumina-silicate clays meeting the above specifications are those known commercially as Bentolite L, Gelwhite L, Clarolite T–60 and Filtaclay 75.

In the isomerization these unique clays are activated with acids, usually mineral acids such as sulfuric and phosphoric acids, preferably sulfuric acid. Certain organic acids such as toluenesulfonic acid are also acceptable.

The clay may be activated prior to adding it to the isomerization mixture; or it may be activated in situ before being added to the isomerization mixture. If activated in situ, the clay is desirably dried beforehand until it contains roughly 5 to 8 weight percent water. Care should be taken against overdrying the clay since it may cause partial deactivation. Sufficient drying is usually accomplished at 100 to 120° C. for 2 to 3 hours. After drying, the clay is put into the reactant mix together with from about .02 to 0.1 g. acid per g. of clay.

When activated beforehand, the clay is contacted with an anhydrous acid solution such as sulfuric acid in ether. The slurry is filtered and washed repeatedly with solvent to remove excess acid. After a brief drying, the clay is a good isomerization catalyst without adding more acid.

The previously activated clay or acid and clay are added to the reactant mixture comprising at least one of either o- or p-alkylphenols having alkyl groups with at least 5 carbon atoms and phenol or 1-alkene of at least 5 carbon atoms. The presence of phenol favors forming m-monoalkylphenols; whereas the presence of 1-alkene favors forming m-dialkylphenols. The mol ratio of phenol to alkylphenols will usually be at least about 0.5:1; desirably it will be between about 0.5 and 3:1. The clay will generally comprise about 5 to 40 weight percent based on the alkylphenol reactant, preferably 7 to 30 weight percent.

The total reaction mixture is heated rapidly to between about 125° C. and the decomposition temperature of the reactants. Preferably the temperature will be kept between about 140 and 200° C., and most preferably at the reflux temperature of the mixture (180–190° C.). Although sub- or superatmospheric pressures may be used in the process, it is convenient to use atmospheric or autogenous pressure. Under these conditions the isomerization reaches equilibrium in about ½ to about 4 hours, usually between about ½ to 2 hours. The specific composition of the clay, amount of clay and temperature significantly affect the isomerization rate. At the end of this period, the clay may be filtered off and the filtrate fractionated by distillation.

The o- and p-alkylphenols having alkyl groups containing at least 5 carbon atoms, usually 5 to about 30 carbon atoms, to which this improved process applies are exemplified by the o- and p-isomers of amylphenol, hexylphenol, heptylphenol, octylphenol, nonylphenol, decylphenol, dodecylphenol, hexadecylphenol, octadecylphenol, eicosylphenol, docosylphenol, tricosylphenol and the like or mixtures thereof. Preferably these alkylphenols are sec. alkylphenols.

The o- and p-alkylphenols may be made by alkylating phenol with olefins in the presence of an alkylation catalyst such as a strong acid or acid-activated clay. A preferred feed stock for the process of this invention may be made by reacting phenol with straight-chain 1-alkenes having at least 5 carbon atoms in the presence of the clay and acid which are used for the isomerization. It is best to use as pure a 1-alkene charge as possible. To make sec. o- and p-alkylphenols in this way the 1-alkene is heated with excess phenol in the presence of clay and acid at between about 40 and 110° C. for a time sufficient to alkylate the phenol. Lower temperatures in the alkylation range favor forming o-alkylphenols and/or alkylphenyl ethers. Such alkylphenyl ethers are believed to be intermediates in the reaction. They are also suitable starting materials for making m-alkylphenols according to this process.

As used herein the term "bound iron" means the iron content of the clay as determined by emission spectroscopy after the clay has been treated to remove free iron oxides by the sodium dithionite-citrate-bicarbonate method. This method is described generally by Aguilera and Jackson, S.S.S.A. Proc., 17:359 (1953); 18:223 and 350 (1954). In determining the bound iron of the clays described herein, 10 g. of neutral dry clay was mixed with 40 cc. of 0.3 M sodium citrate solution in a centrifuge bottle at 80° C. 1 g. of sodium dithionite was added and the resulting slurry was mixed for one minute and then let stand with occasional mixing for another 15 minutes. 5 cc. of saturated aqueous NaCl solution was added and the combined mixture was centrifuged at 2,000 r.p.m. for 7 to 8 minutes, then decanted. This procedure was repeated.

The thus treated clay was then slurried twice with 40 cc. portions of deionized water; with centrifugation after each washing. After the last decantation, acetone was added and the clay was recovered from the acetone by filtration. The clay was then dried at 100° C. overnight and the iron content was determined by emission spectroscopy.

EXAMPLES

The following examples illustrate this process and the unexpected improved results obtained with it. These examples are offered only to illustrate this invention. They are not meant to limit the process herein described and claimed.

Example 1

24.6 g. of an o- and p-sec. amylphenol mixture was added to 9.4 g. phenol in a vessel. 6.4 g. of Bentolite L (26 weight percent based on amylphenol), a natural clay having a generally crystal lattice comprising a sheet of alumina octahedra between two silica tetrahedra, and 0.4 g. concentrated $H_2SO_4$ were added to the amylphenol/phenol mixture. The analysis of the clay on a dry weight percent basis was:

$SiO_2$, 74.2; $Al_2O_3$, 18.6; MgO, 4.67; CaO, 1.89; $Fe_2O_3$, 0.34; $Na_2O$, 0.22, $K_2O$, 0.046; $TiO_2$, 0.17.

This reaction mixture was heated to reflux (180–190° C.). In 2 hours the reaction had reached equilibrium conversion (~65–70% m-isomer in the mixed amylphenol isomers). This analysis was made by taking a sample of the reaction mixture, filtering off the clay and analyzing the filtrate after acetylation by gas liquid chromatography. Its reproducibility is ±2%.

For comparison a second run was made under identical conditions using the same proportions except that a prior art clay known commercially as Retrol was used instead of Bentolite L. Retrol, on a dry weight basis, has the following analysis:

$SiO_2$, 70.9; $Al_2O_3$, 17.0; MgO, 3.2; CaO, 1.6; $Fe_2O_3$, 3.9; $Na_2O$–$K_2O$, 1.0; $TiO_2$, 0.6.

Treatment of Retrol by the sodium dithionate-citrate-bicarbonate method described above did not lessen its iron content—indicating essentially all the iron in Retrol is bound iron.

At two hours the comparison isomerization had reached about 42% of equilibrium. Even at 14 hours the reaction had reached only 54% of equilibrium.

In further comparison with the above isomerization using Retrol, an isomerization of an o- and p-sec. amylphenol mixture was made using acid-activated Filtaclay 75. Filtaclay 75 is a natural clay having a general crystal lattice comprising a sheet of alumina octahedra between two silica tetrahedra. Its analysis on a dry weight basis is:

$SiO_2$, 66.9; $Al_2O_3$, 21.8; MgO, 3.9; CaO, 0.8; $Fe_2O_3$, 3.4; FeO, 0.3; $Na_2O$–$K_2O$, 1.5; $TiO_2$, 0.5.

Treatment of this Filtaclay 75 by the sodium dithionate-citrate-bicarbonate method described above reduces the iron content to 0.5%—indicating that a major proportion of the iron indicated in the above analysis is unbound iron. Such iron is believed not to be integrally bound into the crystal lattice; but instead is dispersed colloidally in the clay as iron oxide impurities. After 3 hours, this isomeration had reached equilibrium conversion.

Example 2

The isomerization and comparison isomerization of Example 1 were repeated except that an o- and p-sec. octylphenol mixture was used in place of the amylphenol reactant.

By the end of 1 hour the isomerization with Bentolite L had reached equilibrium. It took the isomerization with Retrol about 4 times as long to reach equilibrium.

Example 3

The isomerization and comparison isomerization of Example 1 were repeated except that an o- and p-sec. dodecylphenol mixture was used in place of the amylphenol reactant.

In 1 hour the isomerization with Bentolite L had reached equilibrium. At 1 hour the comparison run had reached only 83% of equilibrium. After 4 hours the comparison run had reached 94% of equilibrium.

To further exemplify the remarkable activity of the clays of this invention and the vast improvement of this process as compared to the prior art, isomerizations and comparison isomerizations were run by the general method of Example 1 with various o- and p-alkylphenol reactants using only 10 weight percent clay, based on alkylphenol. The results of these tests are tabulated below: B=Bentolite L, R=Retrol.

| Ex. No. | Alkylphenol reactant | Clay | Effectiveness Time, hr./percent equilibrium | |
|---|---|---|---|---|
| 4 | Sec. octylphenol | B | 1/100 | |
| | | R | 1/38 | 10/95 |
| 5 | Sec. dodecylphenol | B | 1/100 | |
| | | R | 1/54 | 4/62 |
| 6[1] | Sec. tridecylphenol | B[2] | 4/96 | |
| | | R[2] | 4/31 | |
| 7[1] | Sec. hexadecylphenol | B | 1/85 | 4/100 |
| | | R | [3]1 | 7/10 |
| 8[1] | Sec. eicosylphenol | B | 4/77 | |
| | | R | 7/10 | |

[1] Infrared analysis used.
[2] 9.44 weight percent clay based on tridecylphenol.
[3] Negligible.

Example 9

The isomerization of Example 1 was repeated except that Gelwhite L, a natural clay having a crystal lattice comprising a sheet of alumina octahedra between two silica tetrahedra was used. This clay has the following weight percent analysis on a dry basis:

$SiO_2$, 65.1; $Al_2O_3$, 25.3; MgO, 4.15; CaO, 2.66; $Fe_2O_3$, 1.04; $Na_2O$, 1.35; $K_2O$, 0.04; $TiO_2$, 0.26.

At 3 hours the isomerization had reached 96% of equilibrium.

Other alumina-silicate clays which come within the ambit of the process taught by the art were tried by the method described in Example 1 and found to be ineffective. For example, a montmorillonite clay having the following analysis on a dry weight percent basis showed no isomerization after 4 hours of heating:

$SiO_2$, 72.3; $Al_2O_3$, 16.5; MgO, 3.8; CaO, 1.2; $Fe_2O_3$, 0.3–1.1; NaO, 5.93; $K_2O$, 0.045; $TiO_2$, 0.17.

Similarly, a montmorillonite clay having the following analysis on a dry weight basis was ineffective when used in the isomerization described in Example 1.

$SiO_2$, 62.7; $Al_2O_3$, 24.4; MgO, 4.0; CaO, 2.55; $Fe_2O_3$, 1.02; $Na_2O$, 5.16; $K_2O$, 0.04; $TiO_2$ 0.24.

These failures show that clays in which alkali metals occupy a significant proportion of the base-exchange positions are not effective isomerization catalysts.

As will be evident to those skilled in the art, various modifications of this invention can be made or followed, in the light of the foregoing disclosure and discussion, without departing from the spirit or scope of the disclosure or from the scope of the following claims.

What is claimed is:

1. In the process for isomerizing at least one of either ortho- or para-alkylphenols having alkyl groups which contain at least 5 carbon atoms to their corresponding meta-alkylphenols by heating said o- and p-alkylphenols in the presence of an acid-activated clay wherein the temperature is at least about 125° C. to 200° C., the improvement for obtaining substantial isomerization equilibrium in from about ½ to about 4 hours which comprises using an alumina-silicate clay having a general crystal lattic comprising a sheet of alumina octahedra between two sheets of silica tetrahedra, a spacing between lattices across (001) between 5 and 30 A., less than about 1.4 weight percent bound iron on a dry weight basis, less than about 1.4 weight percent alkali metal, a cationic base-exchange capacity between about 60 and 120 milliequivalents per 100 g. of said clay and in which the base-exchange positions are occupied predominantly by Group II metal ions.

2. The process of claim 1 wherein the alkyl groups of said o- and p-alkylphenols contain 5 to 30 carbon atoms.

3. The process of claim 1 wherein the alkyl groups of said o- and p-alkylphenols contain 5 carbon atoms.

4. The process of claim 1 wherein the o- and p-alkylphenols are heated in the presence of phenol, the mol ratio of phenol to alkylphenol being at least about 0.5:1.

5. The process of claim 1 wherein the temperature is about 140 to 200° C.

6. The process of claim 1 wherein said acid is sulfuric acid.

7. The process of claim 1 wherein said Group II metal ions are alkaline earth metal ions.

8. The process of claim 1 wherein said Group II metal ions are calcium ions or magnesium ions.

9. The process of claim 1 wherein said o- and p-alkylphenols are sec. o- and p-alkylphenols.

10. The process of claim 1 wherein the spacing between lattices across (001) is between about 10–20 A.

References Cited

UNITED STATES PATENTS 3,014,079  12/1961  Olin _____ 260—624 E

BERNARD HELFIN, Primary Examiner

W. B. LONE, Assistant Examiner

U.S. Cl. X.R.
260—621 E